United States Patent

Ball et al.

[11] Patent Number: 6,167,289
[45] Date of Patent: Dec. 26, 2000

[54] POWER SUPPLY ASSEMBLY FOR PORTABLE PHONE

[75] Inventors: Scott R. Ball; Paul E. Peterzell, both of San Diego, Calif.

[73] Assignee: Qualcomm Incorporated, San Diego, Calif.

[21] Appl. No.: 09/027,354

[22] Filed: Feb. 20, 1998

[51] Int. Cl.$^7$ .................................................. H04B 1/38
[52] U.S. Cl. ........................................ 455/572; 455/572
[58] Field of Search .................................. 455/572, 573, 455/575, 90, 127, 343, 348, 349; 320/119, 118, 160, 135, 138

[56] References Cited

U.S. PATENT DOCUMENTS

| | | | |
|---|---|---|---|
| 5,440,221 | 8/1995 | Landau et al. | 320/22 |
| 5,613,229 | 3/1997 | Baranowski et al. | 455/127 |
| 5,684,384 | 11/1997 | Barkat et al. | 320/6 |
| 5,686,808 | 11/1997 | Lutz | 320/2 |
| 5,701,597 | 12/1997 | Nakanishi et al. | 455/127 |
| 5,768,371 | 6/1998 | Snyder | 379/446 |
| 5,860,015 | 1/1999 | Olson | 395/750.01 |
| 5,862,493 | 1/1999 | Barkat et al. | 455/572 |

FOREIGN PATENT DOCUMENTS 0688082  6/1995  European Pat. Off. ............ H02J 7/00

*Primary Examiner*—Reinhard J. Eisenzopf
*Assistant Examiner*—Naghmeh Mehrpour
*Attorney, Agent, or Firm*—Philip R. Wadsworth; Charles D. Brown; Tom Streeter

[57] ABSTRACT

A portable phone has an internal battery and an external battery pack is releasably attachable to the phone. A control unit in the phone controls connection of the respective batteries to a phone power input, depending on the detection of the external battery voltage. Whenever an external battery is present with a voltage above a predetermined minimum value, the external battery will be connected to the phone power input to provide power to operate the phone, so that the internal battery lifetime is extended. When the external battery voltage falls below the minimum value, or the external battery is removed, the unit automatically switches to internal battery power, so that the external battery can be changed without interrupting power supply to the phone, if the phone is on or during a call.

2 Claims, 2 Drawing Sheets

POWER SUPPLY ASSEMBLY FOR PORTABLE PHONE

CROSS-REFERENCES TO RELATED APPLICATIONS

This invention is related to our co-pending Application entitled "External Battery Assembly for Portable Phone", filed on even date herewith.

BACKGROUND OF THE INVENTION

The present invention relates generally to power supplies for portable phones, and is particularly concerned with a portable phone with internal and external battery, and a power supply control system and method for the portable phone.

Portable phones may have an internal battery for providing power, or an external battery which is releasably mounted on the phone body while in use, and is removed for re-charging when the phone is not in use. Batteries typically require changing after a large number of discharge and charge cycles, typically after 500 to 1000 cycles. When the battery is internal, the user must have access to the internal battery without disassembling the phone. This can involve a relatively complex procedure.

As internal components decrease in size, an internal battery dominates the overall length, width, and thickness of a portable phone. An external battery attached to the phone also involves extra plastic thickness in the overall phone assembly. Another problem with either internal or external batteries is potential loss of calls if the battery loses power during a call. In a conventional portable phone, it is not possible to change or re-charge the battery without turning off the phone.

SUMMARY OF THE INVENTION

It is an object of the present invention to provide a new and improved power supply arrangement for a portable phone.

According to one aspect of the present invention, a power supply assembly for a portable phone is provided, which comprises an internal battery for mounting in a portable phone housing, an external battery for releasable mounting on the phone housing, a control assembly connected to the internal and external batteries to control connection of the respective batteries to a phone power line, and a charge input connected to the control assembly for connection of a charging device to a selected battery. The control assembly includes first and second detectors for detecting the charge status of the respective internal and external batteries, first and second switches for controlling connection of the internal battery and the external battery to the phone power line, respectively, and a control unit having a first output signal for controlling the state of the first switch and a second output signal for controlling the state of the second switch, the control unit being responsive to the detector outputs to close the first switch and open the second switch if the charge status of the external battery is below a predetermined minimum value, and to open the first switch and close the first switch if the charge status of the external battery is above a predetermined minimum value, whereby the external battery provides power at all times when present and when the battery voltage is at or above the minimum value. If the external battery voltage falls low, the system automatically switches to internal battery power, so that a stable power source is guaranteed at all times. The minimum voltage is based on the minimum operating voltage of the phone.

The control unit is arranged to switch off the phone automatically if both batteries fall below a minimum voltage. Preferably, the control unit is also connected to the external charge input and detects when a charging voltage is present at the input, indicating that the batteries are to be charged. The unit controls charging of both the external and internal batteries, with the internal battery being charged first. Preferably, both rapid charge and trickle charge inputs are provided for each battery from the charge input, and the control unit controls suitable switches to determine whether each battery is trickle charged or rapid charged, based on the detected battery voltage. The trickle charge input is used to charge each battery when the battery voltage is below the minimum operating voltage of the phone, and the control unit switches automatically to rapid charging when the battery voltage is detected to be higher than the minimum operating voltage.

In a preferred embodiment of the invention, the internal battery is mounted on the inside of a door or back lid providing access to the interior of the phone housing. The external battery is designed to be mounted over the lid with contacts engaging corresponding contacts on the outside face of the lid. Pin contacts connect the internal battery and external battery contacts to the main circuit card assembly (CCA) of the phone. The pins contact corresponding pads on the main CCA for internal and external battery power, and to provide inputs to the control unit for controlling which battery provides power and which battery is charged when the external charger is connected to the phone. This arrangement allows the user to easily replace the internal battery without complicated tools or assembly instructions.

The power supply assembly of this invention provides a reliable and stable power source from the external or internal battery, and allows swapping of the external battery for a new external battery while the phone is in a call or turned on. The internal battery guarantees a stable power source at all times during the swapping process.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
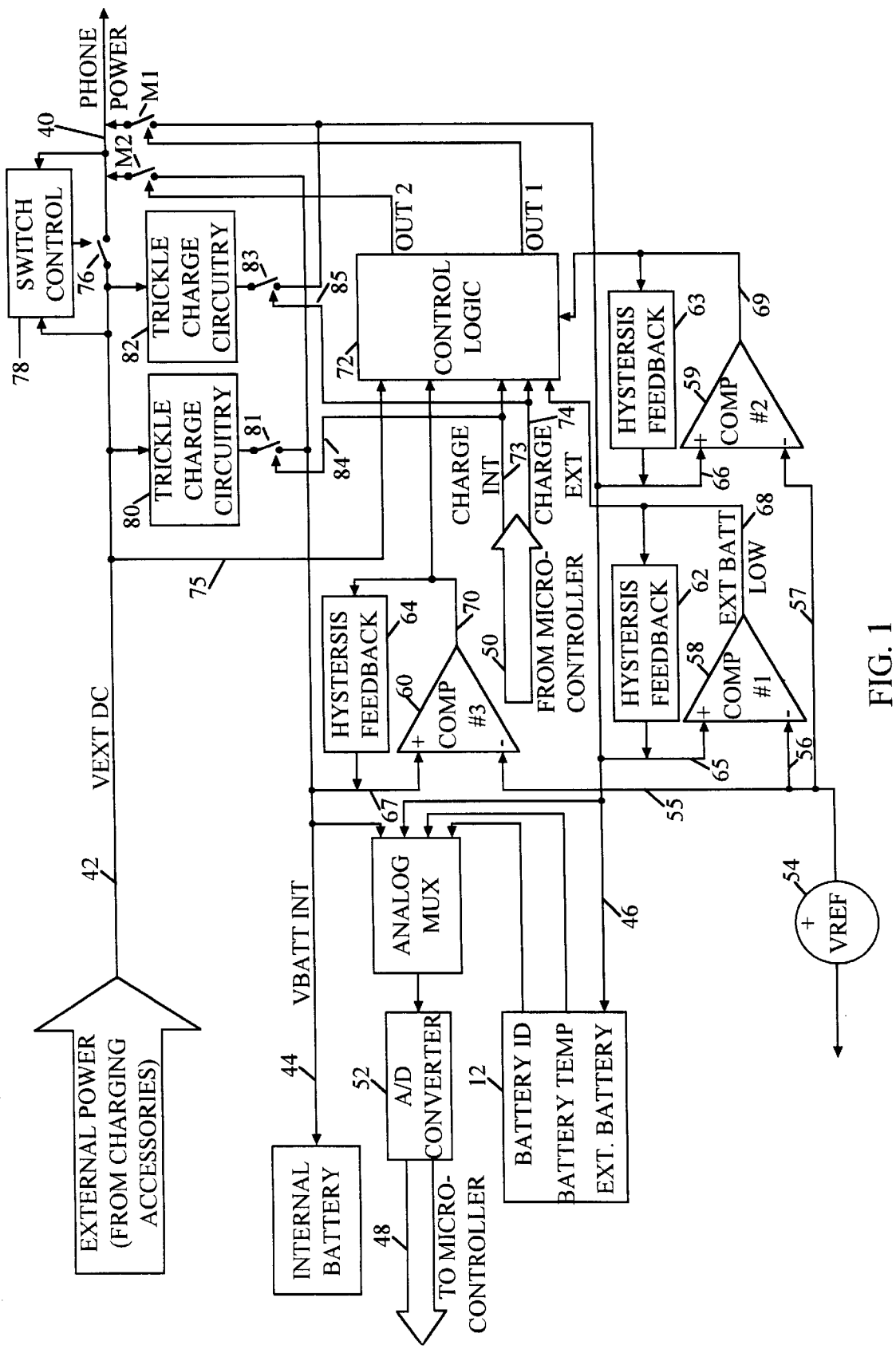
FIG. 1 is a diagram of the battery control and charging circuitry of a power supply assembly according to a preferred embodiment of the invention.
Figure 3:
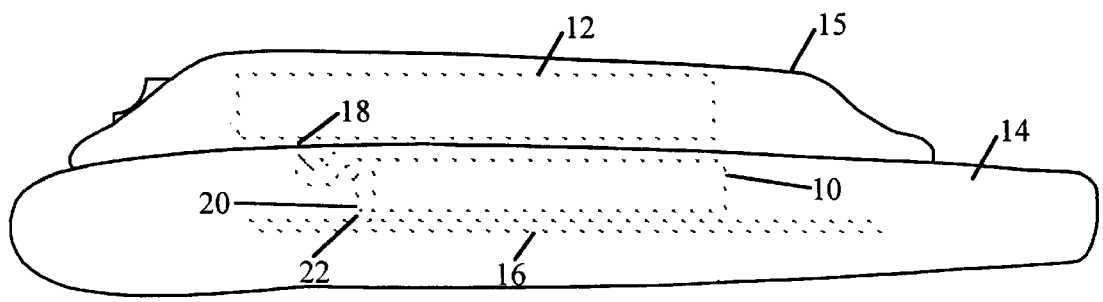
FIG. 3 is a side view of a portable telephone unit with an external battery pack attached.

FIG. 1 illustrates a battery control and charging circuit according to a preferred embodiment of the present invention for controlling power output from, and charging input to, a portable phone internal battery 10 and external battery 12. FIG. 3 illustrates a portable phone having a main body 14 and a releasable external battery pack or unit 15 secured to a rear wall of the main body. A main circuit card assembly 16 is mounted in the main body, and carries components and circuitry for the portable phone, as will be understood by those skilled in the field.

As described in more detail in our co-pending application entitled "External Battery Assembly for Portable Phone"

filed on even date herewith, the contents of which are incorporated herein by reference, the internal battery 10 is preferably mounted on the inner face of a lid releasably mounted in the outer wall of the phone body, facing the CCA 16. Contacts in recesses on the outer face of the lid will contact leaf spring battery contacts 18 which project into the contact recesses when the battery pack is secured to the phone body, as described in our co-pending application referred to above.

The internal battery contacts are routed through a self-protection circuit and a flex circuit to conductive pogo pins 20 which match pad locations 22 on the main CCA for providing battery power to the phone. The arrangement of the removable lid and the pogo pin connectors allows the user to replace the internal battery easily without any disassembly of the phone. The contacts which connect to the external battery contacts 18 are also connected via a flex circuit to the pogo pins 20 for connection of external battery power to the phone.

This arrangement minimizes phone thickness and eliminates stack-up of components on the rear side of the CCA, leaving more space for integration of other accessories into the same volume as the base phone design, or as an additional external module which can be mated to the base phone. These accessories may use different contacts on the main CCA depending on the quantity and type of input/output required. Some examples of possible accessories, some or all of which may be integrated internally or externally into the phone CCA, are as follows: a smaller prismatic battery, FM radio, subscriber identification module (SIM), software enhancement module (e.g. drivers for different user interfaces, algorithms for improved performance, video games with dot-matrix display on the phone, etc.), hardware enhancements such as expanded phone-book memory, voice recording DSP/memory, vibrator, loudspeaker, voice recognition hardware/software module, video game firmware module, GPS receiver, and so on. The accessories may conveniently also be mounted on the inner face of the lid or phone outer wall, and connected via similar pogo pin contacts to contact pads on CCA 16.

These accessories allow users to buy and install features they most want and use on a daily basis. The arrangement permits other electronic devices, for example any of the enhancements referred to above, to be integrated into one common phone unit without compromising size, weight, or performance. Additional accessories may also be provided in the external battery unit if desired, for connection via the mating contacts, flex circuit, and pogo pins into the main CCA.

FIG. 1 is a schematic illustrating a control circuit which may be mounted on the main CCA for input/output to the external and internal battery, and an external charging unit. The circuit has an output line 40 for connection to the phone power input, an input 42 for connection to an external power input from a charging unit or accessory, an input/output line 44 to the internal battery 10, and an input/output line 46 to the external battery 12. The circuit also has a microcontroller output 48 and microcontroller input 50. Various battery outputs (voltage, battery temperature, battery ID) are connected via an analog to digital converter 52 to the microcontroller output, for monitoring of the battery condition. A reference voltage input 54 is also provided on line 55. Inputs 56,57 are provided from reference voltage line 55 to a first comparator 58 and a second comparator 59. Line 55 is also connected to a third comparator 60. Each comparator 58, 59, 60 has a hysterisis feedback 62, 63, 64, respectively.

A second input 65,66 to the first and second comparators, respectively, is provided from the external battery output 46. A second input 67 to the third comparator is provided from the internal battery output line 44. The comparator outputs 68, 69, 70, respectively, are each provided as inputs to a control logic module 72. Control logic module 72 also has internal charge and external charge control inputs 73,74 from the microcontroller input 50, and a control input 75 from the external charging power input line 42.

A first MOSFET switch M1 controls connection of the external battery I/O line 46 to the phone power output 40, and second MOSFET switch M2 controls connection of the internal battery I/O line 44 to the phone power output 40. The condition of the switches M1 and M2 is controlled by first and second signal outputs OUT1 and OUT2 from the control logic module, as explained in more detail in Tables 1, 2, and 3 below.

A switch 76 controlled by switch control device 78 controls connection of the external power charge input on line 42 to the battery charge inputs via switches M1, M2 for fast charging of the batteries, as is also explained in more detail in Tables 1, 2 and 3. Line 42 is also connected via first trickle charge circuitry 80 and switch 81 to the internal battery charge input via line 44, and via second trickle charge circuitry 82 and switch 83 to the external battery charge input via line 46. The switch 81 is controlled by an internal charge signal on line 73 via line 84, and the switch 83 is controlled by an external charge signal on line 74, via line 85.

Figure 2:
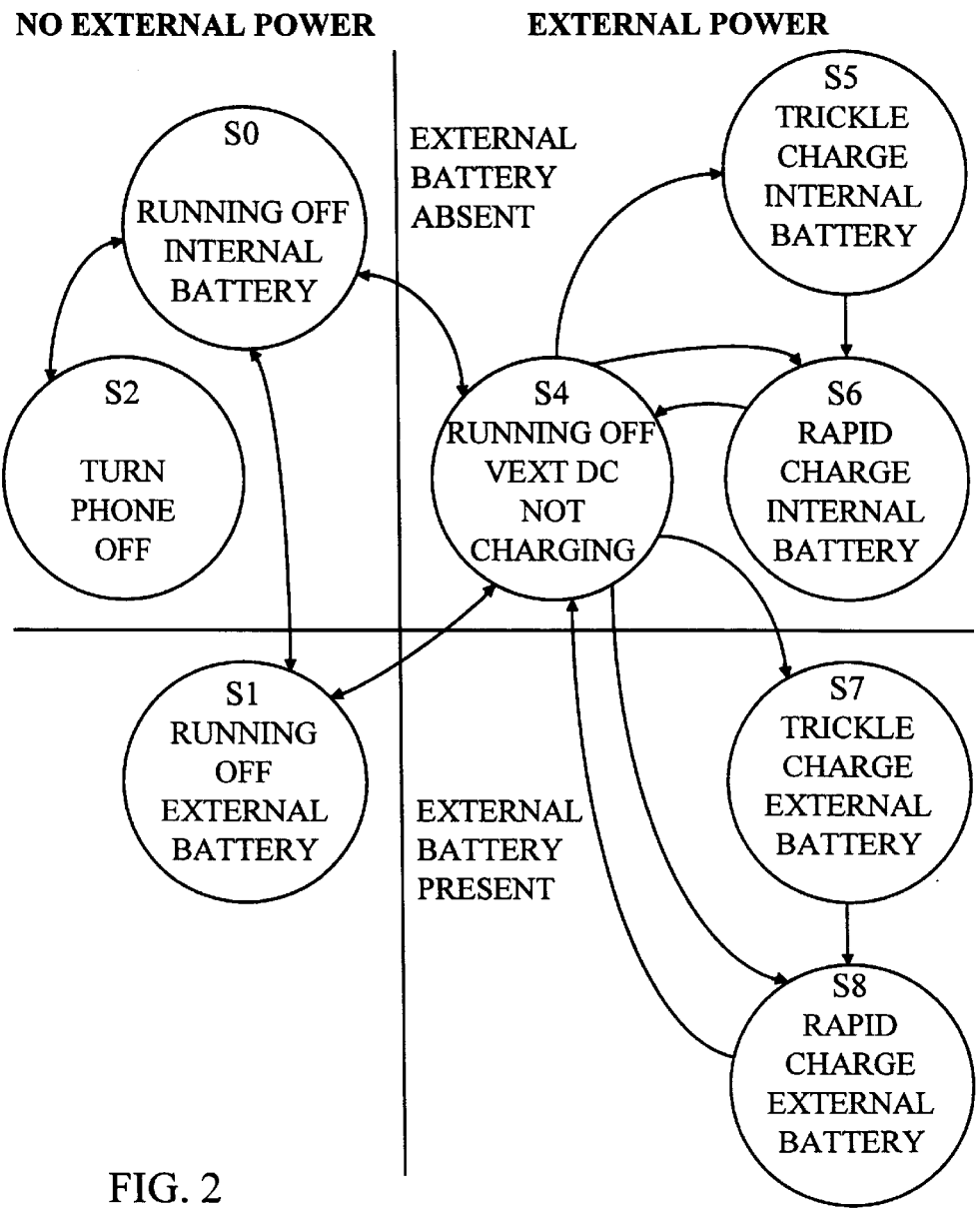
FIG. 2 is a battery control state diagram.

FIG. 2 is a battery control state diagram illustrating the possible battery control states S0 to S8 under the control of the control circuit as illustrated in FIG. 1 as well as programmed inputs from the microcontroller, as also explained in Table 1 below, which is a description and explanation of the various battery control states.

TABLE 1

Consolidated Battery control

| State | A<br>VEXT_DC | B<br>EXT_BATT_LOW# | C<br>FORCE_TRKL_EXT# | D<br>CHARGE_EXT | E<br>FORCE_TRKL_INT# | F<br>CHARGE_INT |
|---|---|---|---|---|---|---|
| S0 | 0 | 0 | X | X | 1 | X |
| S1 | 0 | 1 | 1 | X | 1 | X |
| S2 | 0 | 0 | X | X | 0 | X |
| S3 | 0 | 1 | 0 | X | X | X |
| S4 | 1 | X | X | 0 | X | 0 |
| S5 | 1 | X | X | 0 | 0 | 1 |
| S6 | 1 | X | X | 0 | 1 | 1 |
| S7 | 1 | X | 0 | 1 | X | X |

TABLE 1-continued

| State | | | | | | | |
|---|---|---|---|---|---|---|---|
| S8 | 1 | X | 1 | 1 | X | X | |

| State | OUT1 EXTERNAL | OUT2 INTERNAL | Interpretation |
|---|---|---|---|
| S0 | 1 | 0 | Running off internal battery |
| S1 | 0 | 1 | Running off external battery |
| S2 | 1 | 0 | Turn phone off. Internal battery empty. |
| S3 | 0 | 1 | Not valid. EXT_BATT_LOW# should go low first. |
| S4 | 1 | 1 | Running off VEXT. Not charging. |
| S5 | 1 | 1 | Trickle charge internal battery |
| S6 | 1 | 0 | Rapid charge internal battery |
| S7 | 1 | 1 | Trickle charge external battery |
| S8 | 0 | 1 | Rapid charge external battery |

Assumptions:
1. Software never turns on CHARGE_INT or CHARGE_EXT when VEXT_DC = 0
2. Software never turns on CHARGE_EXT and CHARGE_INT at the same time
3. EXT_BATT_LOW# goes low before FORCE_TRKL_EXT#

Consolidated Battery control, with EXT_BATT_LOW and FORCE_TRKL_EXT# combined
The main purpose of Comparator #1 is for hot swapping between internal and external batteries

| State | A VEXT_DC | B EXT_BATT_LOW# | C | D CHARGE_EXT | E FORCE_TRKL_INT# | F CHARGE_INT |
|---|---|---|---|---|---|---|
| S0 | 0 | 0 | | X | 1 | X |
| S1 | 0 | 1 | | X | 1 | X |
| S2 | 0 | 0 | | X | 0 | X |
| S4 | 1 | X | | 0 | X | 0 |
| S5 | 1 | X | | 0 | 0 | 1 |
| S6 | 1 | X | | 0 | 1 | 1 |
| S7 | 1 | 0 | | 1 | X | X |
| S8 | 1 | 1 | | 1 | X | X |

| State | OUT1 EXTERNAL | OUT2 INTERNAL | Interpretation |
|---|---|---|---|
| S0 | 1 | 0 | Running off internal battery |
| S1 | 0 | 1 | Running off external battery |
| S2 | 1 | 0 | Software must turn phone off. Internal battery empty |
| S4 | 1 | 1 | Running off VEXT. Not charging. |
| S5 | 1 | 1 | Trickle charge internal battery |
| S6 | 1 | 0 | Rapid charge internal battery |
| S7 | 1 | 1 | Trickle charge external battery |
| S8 | 0 | 1 | Rapid charge external battery |

Assumptions:
1. Software never turns on CHARGE_INT or CHARGE_EXT when VEXT_DC = 0
2. Software never turns on CHARGE_EXT and CHARGE_INT at the same time As indicated in FIG. 2 and Table 1, the battery control state S0 is when the internal battery is connected to the phone power input line 40. In this condition, switch M2 is closed and switches M1 and 76 are open. In control state S1, the external battery is connected to the phone input line 40, and switch M1 will be closed while switches M2 and 76 are open. In control state S4, the phone is running off the external power from the charging unit, i.e. switch 76 is closed and switches M1, M2 are open, and no charging is taking place, so switches 81 and 83 will also be open. In control state S5, the internal battery is being charged via the trickle charge circuitry 80. In this state, switch 81 will be closed while switches M1, M2, 76, and 83 are all open. In control state S6, the internal battery is undergoing rapid charge. In this state, switches 76 and M2 will be closed while all other switches are open. In control state S7, the external battery is trickle charged via switch 83, which will be closed while all other switches are open. Finally, in control state S8, the external battery is rapid charged and switches 76 and M1 are closed while all other switches are open.

Table 2 below indicates the various control signals and their interpretation, for better understanding of the various states in Table 1.

TABLE 2

| | Signal | Generated by | Logic | Interpretation |
|---|---|---|---|---|
| A | VEXT_DC | Charging accessories | 1 | External Power present |
| | | | 0 | External Power absent |
| B | EXT_BATT_LOW# | Comparator #1 | 1 | External Battery Voltage > =3.4 volts + hysterisis EXACT Thresholds TBD |

TABLE 2-continued

| Signal | | Generated by | Logic | Interpretation |
|---|---|---|---|---|
| C | FORCE_TRKL_EXT# | Comparator #2 | 0 | External Battery Voltage <3.4 volts |
| | | | 1 | Ok to rapid charge External battery, VBATT_EXT > =3.4v + hysterisis EXACT Thresholds TBD |
| | | | 0 | Ok to trickle charge External battery, VBATT_EXT <3.4v |
| D | CHARGE_EXT | GPIO 26 (dig. output) | 1 | Software wants to charge External battery - will only be asserted when External Power is present |
| | | (under Software Control) | 0 | Software does not want to charge the External battery |
| E | FORCE_TRKL_INT# | Comparator #3 | 1 | Ok to rapid charge Internal battery, VBATT_INT > =3.4v + hysterisis EXACT Thresholds TBD |
| | | | 0 | Ok to trickle charge Internal battery, VBATT_INT <3.4v |
| F | CHARGE_INT | GPIO 9 (dig. output) | 1 | Software wants to charge Internal battery - will only be asserted when External Power is present |
| | | (under Software Control) | 0 | Software does not want to charge the Internal battery |
| Out1 | Vg External battery MOSFET | | 1 | MOSFET to external battery off |
| | | | 0 | MOSFET to external battery on |
| Out2 | Vg Internal battery MOSFET | | 1 | MOSFET to internal battery off |
| | | | 0 | MOSFET to internal battery on |

The current battery control state is controlled by output signals from the control logic unit and the microcontroller, based on battery input signals and input signals from the three comparators. States S0 to S3 occur when there is no external voltage present on line 42, as indicated in Table 1, while states S4 to S8 occur when there is an external voltage VEXT.DC on line 42, as detected by the control logic module 72 on line 75. Thus, signal A is logic 1 when external power is present, and logic 0 when no external power is present.

Signal B in Tables 1 and 2 is the output from comparator 58, EXT.BATT.LOW, which occurs when the reference input 56 is higher than the input 65 from the external battery. Signal C is the output from the second comparator 59, FORCE.TRKL.EXT, which determines whether the battery will be rapid charged or trickle charged. Signal D is the CHARGE.EXT signal on line 74, while signal F is the CHARGE.INT signal on line 73. These signals will be 1 if the software wants to charge the respective battery, which is only asserted if external power is present, or logic 0 if the software does not want to charge the respective battery. Signal E is the output 70 from the third comparator, FORCE.TRKL.INT, which is a logic 1 if the internal battery may be rapid charged, and logic 0 if the internal battery should be trickle charged.

The threshold voltage or reference voltage on line 55 is determined based on the operating voltage of the phone. In this example the threshold voltage is 3.4 volts, although other values may be possible. The hysterisis ranges and operating voltage can be determined once the operating voltage and load currents of the phone design are determined. The first comparator 58 requires sufficient hysterisis feedback to ensure that the output does not oscillate. The minimum hysterisis voltage range is calculated by subtracting the voltage drop between the external cell at maximum discharge rate from the open-circuit voltage of the external cell. The main purpose of the first comparator is to allow hot swapping between the internal and external batteries.

The software is designed such that the system will normally be run by the external battery 12, and will only switch to the internal battery 10 if the external battery falls below the threshold voltage or is removed. Thus, as illustrated in FIG. 3, the system will run off the external battery when there is no external power and the external battery is present (S1), and will switch to state S0 automatically when the external battery is not present. This arrangement enables the user to remove and replace an external battery while the phone is on or in a call, without losing power. The internal battery provides a stable power source at all times during the battery swapping process.

The microcontroller software reads each battery voltage via the analog to digital converter 52, and continuously monitors the overall capacity of both battery packs, displaying the result on the phone monitor. If both the internal and external batteries are at or below 3.4 volts, the software will indicate a low battery condition to the user and will turn off the phone.

The microcontroller software also controls charging of the internal and external batteries via control signals D and F on lines 73 and 74. Only one of these will be activated at any time. The internal battery is always charged first. The circuitry controls whether the battery is trickle charged or fast charged, using the second and third comparators 59 and 60. This may alternatively be done by the microcontroller software, if desired. In the illustrated embodiment, both comparators require sufficient hysterisis to ensure that the transition from trickle charging to fast charging occurs when the detected battery voltage is higher than the minimum operating voltage of the phone. The output of each comparator must be low when the battery voltage is less than 3.4 volts. The hysterisis value is dependent on the tolerance of the comparator circuit, and a tighter tolerance shortens the time spent in trickle charge mode which would shorten the charging time to full capacity from a starting voltage near 3.4 volts.

The control circuit in conjunction with the microcontroller control inputs therefore automatically determines which battery provides the phone power input, and also determines the sequence of battery charging when external (charge) power is present, according to Tables 1 and 2 above. Table 3 below is a Karnough map of the battery switching logic for control logic module 72 having signal inputs A, B, D, E and F. The simplified OUT1 table is for a circuit in which comparators 1 and 2 are combined and signal C is eliminated, as indicated in the lower half of Table 1.

TABLE 3

Out1

| AB/CD | 00 | 01 | 11 | 10 |
|---|---|---|---|---|
| 00 | 1 | 1 | 1 | 1 |
| 01 | 0 | 0 | 0 | 0 |
| 11 | 1 | 1 | 0 | 1 |
| 10 | 1 | 1 | 0 | 1 |

OUT1 = ¯A&¯B + A&¯C + A&¯D

Simplified Out1

| AB/D | 00 | 01 |
|---|---|---|
| 00 | 1 | 1 |
| 01 | 0 | 0 |
| 11 | 1 | 0 |
| 10 | 1 | 1 |

OUT1 = ¯B + A&¯D

Out2

| AB/EF | 00 | 01 | 11 | 10 |
|---|---|---|---|---|
| 00 | 0 | 0 | 0 | 0 |
| 01 | 1 | 1 | 1 | 1 |
| 11 | 1 | 1 | 0 | 1 |
| 10 | 1 | 1 | 0 | 1 |

OUT2 = ¯A&B + A&¯E + A&¯F

The control circuit and software illustrated in FIGS. 1 and 2 and Tables 1 to 3 above automatically controls power supply to the phone circuitry and also controls charging of both the internal and external batteries. The software is designed to always provide power from the external battery when present, if it has a sufficiently high voltage and if no external power is present on line 40. If the external battery is detected to be removed or at too low a voltage, the software is arranged to automatically switch to the internal battery. This enables users to swap one external battery pack for a new battery pack, even when the phone is switched on or during a call, without loss of signal. The software is also designed to always charge the internal battery first, and to trickle charge when necessary, followed by fast charge when the battery voltage is high enough. This reduces charging time.

The software reads each battery voltage via the analog to digital converter output 48, determines the overall capacity of both batteries, and displays the result. A temperature sensor is associated with each battery, and the temperature output is monitored, both to provide a more accurate determination of the battery capacity, and also to ensure that charging is only done if the temperature is within a predetermined range. The batteries will first be calibrated at room temperature from 3.2 V. to 4.2 V. to guarantee optimal accuracy. An optional external input for battery identification can be used to optimize the charging algorithm for different battery sizes.

This system enables both an internal and external battery to be accommodated, determines which battery provides power at any time, and determines how and when each battery is re-charged, based on threshold voltages and hysterisis values controlled by the phone hardware, software, or a combination of both. The specifics of threshold voltage and hysterisis ranges are determined once the operating voltages and load currents of the phone design are determined. Although the battery connection to the phone power input is determined by hardware in the above example, it may alternatively be software controlled. The battery charging mode and sequence is software controlled in this example, but may alternatively be hardware controlled. This system extends phone operation time between charging cycles by allowing an external battery to be used initially, and an internal battery to be switched in as appropriate. It also permits "hot swapping" of the external battery pack, as noted above. The system allows both the internal and external batteries to be connected to the phone while charging, ensuring that the internal battery is charged first to maintain full charge. By using the external battery, when present, to provide power, the lifetime of the internal battery can be extended. The internal battery is readily accessible for changing when required, via the removable door on which it is mounted.

Although a preferred embodiment of the invention has been described above by way of example only, it will be understood by those skilled in the field that modifications may be made to the disclosed embodiment without departing form the scope of the invention, which is defined by the appended claims.

We claim:

1. A power supply control assembly for a portable phone, comprising:

an internal battery for mounting inside a phone housing;

an external battery for releasable mounting on the phone housing;

a control unit connected to the internal and external batteries to control connection of the batteries to a phone power line; and the control unit including first and second detectors for detecting the output voltage of the internal and external battery, respectively, first and second switches for controlling connection of the internal battery and external battery, respectively, to the phone power line, and a signal output device connected to the first and second detectors for producing a first output signal and a second output signal dependent on the output of the external battery, the first and second output signals controlling the first and second switches, the first switch being off and the second switch being on when the output voltage of the external battery is above a predetermined minimum value, whereby power is supplied by the external battery, and the first switch being switched on and the second switch being switched off when the output voltage of the external battery falls below said predetermined minimum value, whereby power is supplied by the internal battery;

the assembly further including an external voltage input connected to the control unit for supplying a charge input to a selected battery, the control unit further including a detector for detecting when the charge input is connected to a charging device, and a selector for controlling connection of the charge input to the external and internal battery, whereby only one battery is connected to the charge input at any time, and the internal battery is charged prior to the external battery;

wherein the charge input has a fast charge input to each battery, and the charge input is connected to first and second trickle charge units having outputs connected to the internal and external battery, respectively, a third switch controlling connection of the first trickle charge unit to the internal battery, and a fourth switch controlling connection of the second trickle charge unit to the external battery, and a controller is connected to the battery outputs and to the fast charge inputs and third and fourth switches to control the speed of charging a selected battery, the controller including means for detecting the output voltage of each battery, initiating a charging cycle when a charge input is detected, connecting a fast charge input to the selected battery if the battery voltage is greater than a predetermined minimum value, and connecting a trickle charge input from the respective trickle charge unit to the selected battery if the battery voltage is below a predetermined minimum value.

2. A method of controlling the power supply to a portable phone, comprising the steps of:

mounting an external battery on a portable phone unit having an internal battery:

detecting an output voltage from an external battery and determining whether the battery output voltage is above or below a predetermined minimum value;

connecting the external battery to an input power line for the phone whenever an external battery is present and the external battery output voltage is above a predetermined value;

automatically switching from the external battery to the internal battery to connect the internal battery to the phone input power line when the external battery is removed or the battery output voltage falls below the predetermined minimum value;

detecting an external voltage input from a charging unit; and on detection of an external voltage input, initiating a battery charging sequence, the sequence comprising connecting the external voltage input to the internal battery until the internal battery is charged, and subsequently connecting the external voltage input to the external battery until charged;

wherein the battery charging sequence further includes the steps of:

providing a fast charge input and a trickle charge input from the external voltage input to each battery;

detecting whether the output voltage of each battery is above a predetermined minimum;

connecting the trickle charge input to a respective battery if the battery output voltage is below a predetermined minimum; and switching from the trickle charge input to the fast charge input when the battery output voltage is above the predetermined minimum.

\* \* \* \* \*